3,016,661
CUTTING DEVICE
Waldemar C. Nielsen, 4412 Don Cota,
Los Angeles 8, Calif.
Filed Nov. 2, 1959, Ser. No. 850,374
9 Claims. (Cl. 51—206)

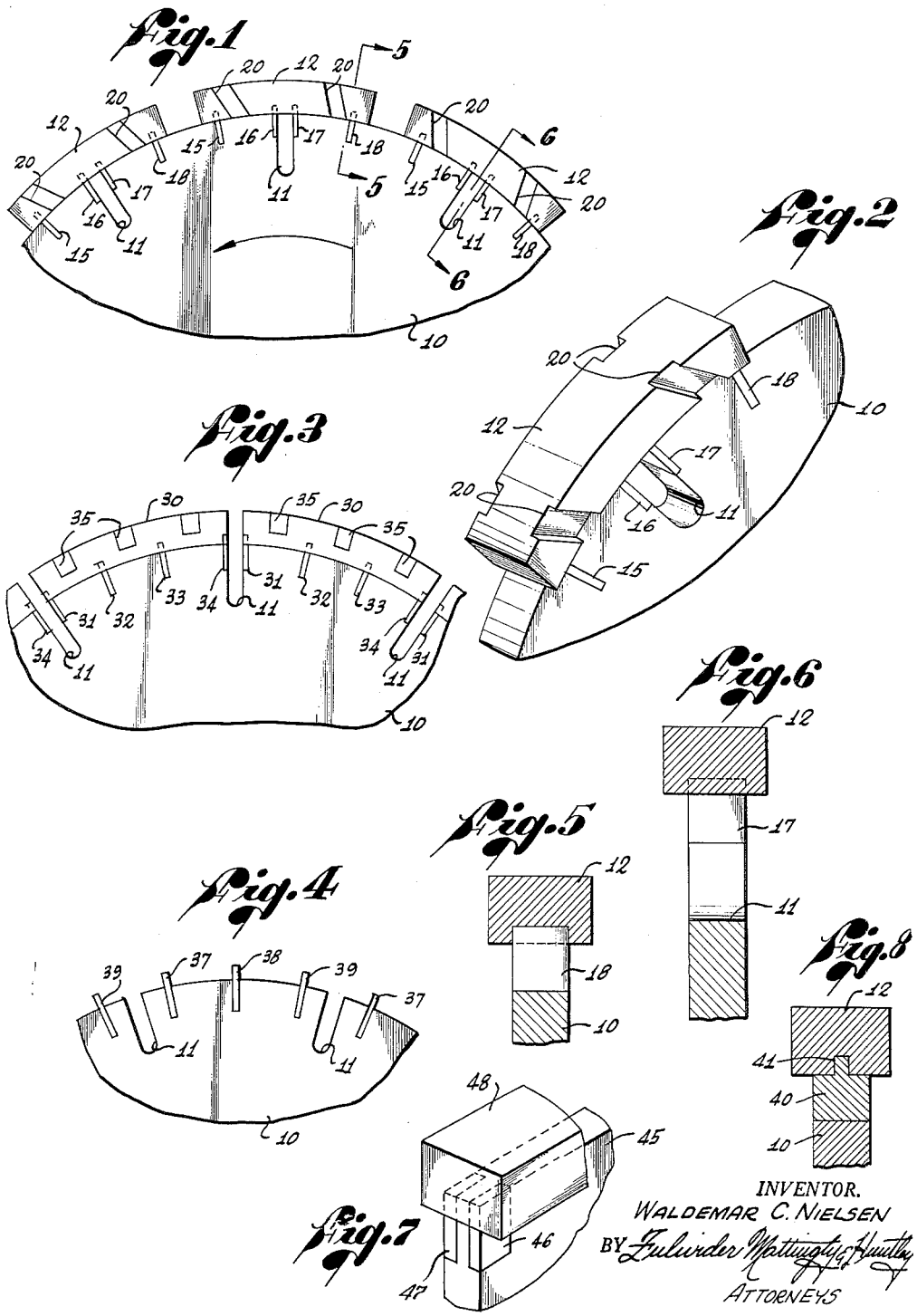

This invention relates to saw devices, and more particularly to improvements in circular saws of the type having spaced cutting elements or segments provided on the periphery of a disc-like core.

Many saws, as for cutting concrete, are formed of a disc-like core having a plurality of spaced radial slots extending from the periphery thereof. A cutting element or segment is secured to the periphery of the core between each pair of adjacent slots, as by brazing or soldering.

The cutting elements are comprised of powdered metal in which diamond particles or chips are dispersed, such metal being compressed and sintered to form a rigid cutting device. Thus, the cutting elements are quite hard.

In cutting concrete, the cutting elements are subjected to very severe stresses that are transmitted to the juncion between the cutting elements and the core. Occasionally, these stresses are so severe that the bond is severed, and the cutting elements are separated from the core.

Concrete cutting saws as above described operate by effectively grinding the aggregate and mortar making up the concrete. This results in creating fine, sharp-edged particles of sand and stone that exert an abrasive effect on the surfaces of the cutting elements, as well as on the core in the vicinity of the slots.

Additional areas of wear are those portions of the core adjacent the lines along which the cutting elements are secured to the core. Wear in these areas results because the metal of the core is softer than the rest of the core, due to the use of heat in brazing or soldering the cutting elements to the core. The particles of sand and stone that are wedged between the sides of the kerf and the core operate to wear down these soft areas, thereby weakening the core to facilitate the cutting elements breaking off.

In order to minimize wear, hardened inserts, e.g., of metal having a Rockwell C hardness that is greater than the Rockwell C hardness (e.g., 28–32) of the steel core, are located in the core in the radial faces of the slots. Such elements extend inwardly from the periphery of the core, whereby to serve as protection for the end portions of the soldered joints. However, despite such provisions, there is still an undesirable amount of wear of the core. Furthermore, such provisions do nothing to help reduce wear of the cutting elements.

It is an object of this invention to provide unique means to overcome the above and other disadvantages of prior art cutting saws.

It is another object of this invention to provide a saw construction including means to reduce wear and to prevent cutting elements from being broken off the core.

A further object of this invention is to provide a saw construction having cutting elements shaped to facilitate removal of sand and stone particles from a kerf.

It is still a further object of this invention to provide a saw construction having a plurality of spaced cutting segments secured to the periphery of a core, and slots in the core intermediate the ends of each cutting segment to aid in agitating and removing sand and stone particles from a kerf.

Yet another object of this invention is to provide a circular saw having hardened elements to lock cutting segments to a core and also minimize wear at different portions of the core.

The above and other objects and advantages of this invention will become apparent from the following description taken in conjunction with the accompanying drawing of illustrative embodiments thereof, and in which:

FIGURE 1 is a partial side elevation view of one form of cutting saw of my invention, showing cutting elements spanning slots in the core, and showing hardened inserts in locking engagement with both the cutting elements and the core;

FIGURE 2 is a perspective view of a cutting element secured to the periphery of the core, showing the configuration of the cutting element for carrying particles out of a kerf and showing a form of hardened insert at the face of a slot;

FIGURE 3 is a partial side elevation view of another modification of my saw construction, showing the cutting heads extending between adjacent slots;

FIGURE 4 is a side elevation view of a core showing all the inserts located between the slots, i.e., with none of the inserts being flush with a slot face;

FIGURE 5 is a partial sectional view taken along the line 5—5 of FIGURE 1, showing the relative dimensions of one form of insert with respect to the core and the cutting element;

FIGURE 6 is a partial elevation view taken along the line 6—6 of FIGURE 1, showing the relative positions of an insert in the face of a slot and a cutting element spanning the slot;

FIGURE 7 is a partial perspective view of a saw in which still another form of insert is used; and FIGURE 8 is a partial sectional view of the core and a cutting element, showing a still further arrangement of an insert therein.

Referring to FIGURE 1, there is shown a cutting saw comprised of a disc-like core 10 having a plurality of spaced radial slots 11 extending from the periphery thereof. Secured to the periphery of the core 10 are a plurality of spaced cutting elements 12, each spanning a slot 11. Thus, the distance between the centers of adjacent slots 11 is greater than the length of a cutting element 12. It will be understood that when the slots 11 are referred to herein as being "spanned" by the cutting elements 12, such slots are not filled by the cutting elements, but in fact constitute openings through the core.

The cutting elements are secured to the periphery of the core 10, as by brazing or silver-soldering. However, my cutting elements and core are additionally locked together by means of spaced inserts 15—18, which preferably are formed of material that is harder than the material of the core. The inserts may be of any desired width, e.g., as shown, equal to the thickness of the core 10.

The hardened inserts 15—18 are located in slots or notches formed in the periphery of the core 10, and they extend into the cutting elements 12. In assembly, the inserts are secured in the core slots so that their outer ends extend beyond the periphery of the core. The cutting elements 12 are formed in a suitable mold so as to have depressions in their bottom surfaces positioned to receive the protruding ends of the inserts. The inserts are then positioned on the periphery of the core, with the protruding ends of the inserts extending into the body thereof, and then are secured in place, as by brazing or silver-soldering them to the core and the inserts.

With my saw construction as above described, it will be seen that the inserts 15—18 perform two functions, viz., they reduce wear in critical areas of the core, and they serve as locking means to prevent the cutting elements being sheared off the periphery of the core. For reducing wear, I locate the inserts adjacent the radial faces of the slots 11 so that particles passing through the slots cannot cause rapid wear of the core adjacent the juncture of the core and the cutting elements. Similarly, their location at softer areas of the core intermediate the slots reduces wear.

As locking devices, it will be seen that the inserts must first be broken before the cutting elements can be sheared off the core. Inasmuch as the inserts extend into the bodies of both core and cutting elements, and are harder than the core, the inserts substantially eliminate the possibility of the cutting elements being broken off the core. As will be apparent, this result is assured primarily by the inserts 15, 18, which have their opposed radial faces (see FIGURES 1 and 5) in abutting engagement with both the core 10 and the cutting elements 12.

The cutting elements 12 also function to carry particles out of the kerf so that wear on the cutting elements is reduced. To this end, the cutting elements 12 (see FIGURES 1 and 2) are provided with spaced slots 20 in their sides. Preferably, the slots 20 are parallel, and are formed along lines that form an angle less than 180° with a radius of the core, such angle being considered from the standpoint of the direction of rotation. Thus, the slots 20 constitute passages for receiving the particles ground off by the cutting elements.

Referring to FIGURE 1, it will be seen that particles entering the slots 20 are carried to the surface of the material being cut. At the surface, the particles lodged in the slots are thrown outwardly. This action results from the centrifugal force due to rotation of the saw. Generally, all particles in slots are discharged therefrom during movement of the cutting elements between the points where they emerge from and re-enter the kerf. Additionally, if desired, a slurry may be created to insure that all particles are removed from the portions of the saw passing above the surface.

Referring to FIGURE 2, the slots 20 on the opposite sides of a cutting element 12 may be oppositely directed, i.e., their center lines form equal but opposite angles with a radius (or respective radii). In this manner, the slots on the opposite sides of the cutting element are arranged to effectively carry particles out of the kerf, regardless of the direction of rotation of the saw. However, if the saw is always to be rotated in the same direction, the slots on both sides are oriented in the same direction, e.g., as in FIGURE 1, for carrying particles out of the kerf.

Also referring to FIGURE 1, the arrangement wherein the cutting elements 12 span the slots 11 permits particles to pass into and through the slots. Thus, the slots serve to keep particles from becoming massed in the kerf, and also to deposit particles therein on the surface as the slots emerge from the kerf.

FIGURE 3 illustrates a modification of my invention wherein cutting elements 30 extend between the slots 11, as do cutting elements in conventional saw constructions. Wear-preventive inserts 31—34 are provided wherein the inserts 31, 34 are located in the faces of the slots 11, and the inserts 32, 33 are located intermediate adjacent slots. As in the construction of FIGURE 1, the inserts 31—34 are embedded at their ends in the core 10 and the cutting elements 30.

For carrying particles out of a kerf, the cutting elements 30 have notches 35 in their sides. As shown, the notches 35 extend only part way from the peripheral surfaces of the cutting elements. However, the notches 35 are deep enough to accommodate all the particles that may be created in any pass of a cutting element into a kerf. The notches 35, which are shown to have radial sides, function in the same manner as the slots 20 in the cutting elements shown in FIGURE 1.

FIGURE 4 illustrates still another arrangement of locking inserts 37—39, wherein the inserts are all embedded in the core intermediate the slots 11, i.e., none of the inserts are contiguous with the slots 11. This arrangement provides maximum strength to withstand shearing off the cutting elements.

Although the inserts are shown in the embodiments of FIGURES 1-4 to be of the same thickness as the core throughout their lengths (as seen in FIGURES 5 and 6), it will be appreciated that the inserts may have a variety of configurations. For example, referring to FIGURE 8, inserts 41 may be employed that are of the thickness of the core, but which have tongues 42 of smaller cross section that extend into the cutting element 12.

In another example (see FIGURE 7), a core 45 may be provided with coextensive notches 46 in which respective inserts 47 are embedded. In this case, cutting elements 48 are provided that have spaced notches to receive the pairs of inserts 47 extending from the periphery of the core.

From the foregoing, it will be apparent that my invention embraces various modifications. For example, an insert may be disposed in a core at an angle to a radius. Such an arrangement is advantageous in that a greater portion of the body of the insert is adapted to absorb impacts, and to make it even more difficult to break off a cutting element. Accordingly, I do not intend that my invention be limited, except as by the appended claims.

I claim:

1. A saw construction comprising: a disc-like core member; a plurality of spaced cutting elements secured to the circumferential edge of said core member, said cutting elements and said core member having aligned openings in their confronting surfaces; and a plurality of lengths of hardened elements having portions extending into the aligned openings in said core member and said cutting elements.

2. A circular saw comprising: a disc-like core of substantially uniform thickness throughout, said core having a plurality of transverse grooves in its peripheral edge, said core also having its circumferential edge interrupted by spaced radial slots; a plurality of cutting segments in abutment with and joined to the peripheral edge of said core and having spaced openings aligned with said grooves; and a respective hardened insert element extending into each groove and the opening aligned therewith, whereby to lock said segments against being sheared off said peripheral edge.

3. A saw construction comprising: a disc-like core of substantially uniform thickness throughout, said core having its peripheral edge interrupted by spaced slots; a plurality of cutting segments joined to the peripheral edge of said core, said segments having no portions extending into said slots; and means carried by said core adjacent the periphery thereof and extending into said segments for locking said segments against being sheared off said peripheral edge, said means including lengths of rigid elements of harder material than said core, said elements being embedded at one end in said core and at their opposite ends in said segments.

4. A circular saw comprising: a disc-like core of substantially uniform thickness throughout, said core having its peripheral edge interrupted by spaced slots; spaced cutting segments secured to the peripheral edge of said core, each segment extending across the outer end of a respective slot, thereby to provide an opening defined by the slot and the portion of the segment extending across the outer end of the slot, said segments including metal and diamond particles compressed and sintered together, each segment having side portions parallel to the core, said side portions having spaced undercuts; and means carried by said core adjacent the periphery thereof and extending into said segments for locking said segments against being sheared off said peripheral edge, said means including lengths of rigid elements of harder material than said core, each of said elements extending at one end into said core and at its opposite end into said segments.

5. A saw device comprising: a disc-like core having a plurality of radial slots extending from its peripheral edge; spaced cutting elements secured to the peripheral edge of said core, each element extending past the outer end of a respective slot, thereby providing an elongated opening through the core, said elements including metal and diamond particles compressed and sintered together, each element having side portions parallel to the core, said side portions having spaced undercuts; and a plurality of lengths of rigid elements of harder material than said core, each rigid element extending at its ends into the abutting surfaces of both the core and the cutting elements, predetermined rigid elements being flush with the radial faces of said slots.

6. A saw device comprising: a disc-like core having a plurality of radial slots extending from its peripheral edge; a plurality of cutting elements with arcuate surfaces conforming to and secured to the peripheral edge of said core, each cutting element spanning a portion of said peripheral edge between adjacent slots, said cutting elements having sides parallel to said core, said sides having spaced slots extending therethrough; and a plurality of lengths of rigid elements of harder material than said core, each rigid element extending at its ends into the abutting surfaces of both said core and the cutting elements, predetermined ones of said rigid elements being flush with the radial faces of said slots.

7. A circular saw comprising: a disc-like core of substantially uniform thickness throughout, said core having its peripheral edge interrupted by spaced slots; a plurality of cutting segments with surfaces conforming to and secured to the peripheral edge of said core, each cutting segment spanning a portion of said peripheral edge between adjacent slots, said cutting segments having sides parallel to said core, said sides having spaced slots extending therethrough, each slot extending along a line at an angle with a radius of the core; and a plurality of lengths of rigid elements of harder material than said core, each rigid element extending at its ends into the abutting surfaces of said core and cutting segments, a respective rigid element being flush with each of the radial faces of said slots.

8. A saw construction comprising: a disc-like core of substantially uniform thickness throughout, said core having its peripheral edge interrupted by spaced slots; and a plurality of spaced cutting segments secured to the peripheral edge of said core, each segment spanning a respective slot, thereby to define a radial opening bounded by the slot and the segment spanning it, each segment having sides parallel to said core, said sides having spaced slots extending therethrough along lines at predetermined angles to radii of said core.

9. A saw device comprising: a disc-like core; spaced cutting elements secured to the peripheral edge of said core, said elements including metal and diamond particles compressed and sintered together, each element having side portions parallel to the core, said side portions having spaced undercuts, said core having spaced elongated openings extending radially from respective cutting elements, the outer end of each opening being located intermediate the ends of a respective cutting element; and a plurality of lengths of rigid elements of harder material than said core, each rigid element extending at its ends into the abutting surfaces of said core and cutting elements, respective rigid elements being flush with the radial faces of said slots, predetermined ones of said rigid elements extending along lines at angles to radii.

References Cited in the file of this patent

UNITED STATES PATENTS

| | | |
|---|---|---|
| 2,032,395 | Bley | Mar. 3, 1936 |
| 2,763,258 | Hughes | Sept. 18, 1956 |
| 2,808,044 | Upper et al. | Oct. 1, 1957 |
| 2,815,746 | Schwarzkoff et al. | Dec. 10, 1957 |

FOREIGN PATENTS

| | | |
|---|---|---|
| 542,054 | Great Britain | Dec. 23, 1941 |